United States Patent
Doshi et al.

(10) Patent No.: US 7,096,275 B1
(45) Date of Patent: Aug. 22, 2006

(54) METHODS AND APPARATUS FOR PROTECTION AGAINST NETWORK FAILURES

(75) Inventors: Bharat Tarachand Doshi, Holmdel, NJ (US); Ramesh Nagarajan, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1154 days.

(21) Appl. No.: 09/588,490

(22) Filed: Jun. 6, 2000

(51) Int. Cl.
*G06F 13/00* (2006.01)
(52) U.S. Cl. .................. 709/238; 709/251; 370/223; 370/242
(58) Field of Classification Search ............. 709/238, 709/239–243, 249–251; 370/222–224, 242, 370/245
See application file for complete search history.

(56) References Cited

U.S. PATENT DOCUMENTS

| | | | |
|---|---|---|---|
| 4,956,835 A | 9/1990 | Grover | |
| 5,093,824 A | 3/1992 | Coan et al. | |
| 5,435,003 A | 7/1995 | Chng et al. | |
| 5,442,623 A | 8/1995 | Wu | |
| 5,537,532 A | 7/1996 | Chng et al. | |
| 5,581,689 A | 12/1996 | Slominski et al. | |
| 5,884,017 A | 3/1999 | Fee | |
| 5,986,783 A * | 11/1999 | Sharma et al. | 398/59 |
| 6,021,113 A | 2/2000 | Doshi et al. | |
| 6,256,295 B1 * | 7/2001 | Callon | 370/254 |
| 6,532,088 B1 * | 3/2003 | Dantu et al. | 359/119 |
| 2001/0003833 A1 * | 6/2001 | Tomizawa et al. | 709/240 |
| 2001/0026384 A1 * | 10/2001 | Sakano et al. | 359/124 |

FOREIGN PATENT DOCUMENTS

| | | |
|---|---|---|
| WO | WO 97/09803 | 3/1997 |
| WO | WO 99/37049 | 7/1999 |

OTHER PUBLICATIONS

B. Edmaier et al., "Alignment Server for Hitless Path-Switching in ATM Networks," International Switching Symposium, pp. 403-407, Apr. 1995.
T-H. Wu et al., "A Broadband Virtual Path SONET/ATM Self-Healing Ring Architecture and Its Economic Feasibility Study," Proceedings of the Global Telecommunications Conference, New York, IEEE, pp. 834-840, Dec. 1992.

(Continued)

Primary Examiner—Moustafa M. Meky

(57) ABSTRACT

Units of traffic are routed between nodes in a network on corresponding sets of trunks, such that the traffic is balanced between disjoint paths. A restoration process for the traffic is implemented using service layer or transport layer switching. In a first embodiment, first and second nodes are connected by first and second sets of trunks, with each of the trunks in a given set of trunks supporting a designated portion of a given one of the units of traffic. The units of traffic are then routed such that a first half of a given one of the units of traffic is routed on a first one of the trunks in a given one of the sets of trunks, and a second half of the given unit is routed on a second one of the trunks in the given set of trunks. In other embodiments, the first and second nodes are connected by first and second sets of trunks so as to form a four-trunk ring, with each of the first and second sets of trunks including a primary trunk and a backup trunk. A given one of the units of traffic is then routed on either an upper or lower portion of the ring. The four trunk ring may be in the form of an IP/optical hybrid ring, in which case the restoration process is implemented using service layer switching, or a SONET/optical ring, in which case the restoration process is implemented using transport layer switching.

15 Claims, 4 Drawing Sheets

OTHER PUBLICATIONS

J. Anderson et al., "Fast Restoration of ATM Networks," IEEE Journal on Selected Areas in Communications, vol. 12, No. 1, pp. 128-138, Jan. 1994.

W.D. Grover, "The SelfHealing™ Network: A Fast Distributed Restoration Technique for Networks Using Digital Cross Connect Machines," IEEE Globecom '87, pp. 1090-1095, 1987.

C.H. Yang et al., "FITNESS: Failure Immunization Technology for Network Service Survivability," IEEE Globecom '88, pp. 1549-1554, 1988.

C.E. Chow et al., "A Fast Distributed Network Restoration Algorithm," IEEE Globecom '93, pp. 261-267, 1993.

S. Hasegawa et al., "Control Algorithms of SONET Integrated Self-Healing Networks," IEEE Journal on Selected Areas in Communications, vol. 12, No. 1, pp. 110-119, Jan. 1994.

W.D. Grover et al., "Near Optimal Spare Capacity Planning in a Mesh Restorable Network," IEEE Globecom '91, pp. 2007-2012, 1991.

H. Komine et al., A Distributed Restoration Algorithm for Multiple-Link and Node Failures of Transport Networks, IEEE Globecom '90, pp. 459-463, 1990.

B.T. Doshi et al., "Dual (SONET) Ring Interworking: High Penalty Cases and How to Avoid Them," Proceedings of ITC 15, pp. 361-370, Jun. 1997.

C. Buyukkoc et al., "Load Balancing on SONET Rings," Proceedings of ICT '96, Istanbul, pp. 763-766, 1996.

S. Cosares et al., "An Optimization Problem Related to Balancing Loads on SONET Rings," Telecommunications Systems, vol. 3, pp. 165-181, 1994.

* cited by examiner

METHODS AND APPARATUS FOR PROTECTION AGAINST NETWORK FAILURES

RELATED APPLICATION

The present application is related to U.S. patent application Ser. No. 09/587,892, filed concurrently herewith in the name of inventor R. Nagarajan and entitled "Efficient Architectures for Protection Against Network Failures," which is incorporated by reference herein.

FIELD OF THE INVENTION

The present invention relates generally to techniques for protecting an optical network or other type of network from a failure in a link, span, node or other element of the network, and more particularly to techniques which permit traffic to be redirected through the network in the event of such a failure.

BACKGROUND OF THE INVENTION

Communication network technology is advancing at a rapid rate. For example, all-optical networks using wavelength division multiplexing (WDM) are currently being deployed for a wide variety of communication applications. WDM techniques allow optical signals having different wavelengths to be multiplexed into a single optical fiber. Each of the wavelengths serves as an optical carrier and can be used independently of the other wavelengths, such that different wavelengths may use different modulation formats to carry different signal types. In one possible implementation, each wavelength may carry a modulation signal representing a synchronous optical network/synchronous digital hierarchy (SONET/SDH) client payload, where each client is a SONET-rate time division multiplexed (TDM) application and the common carried signals are in an OC-x format, where "OC" denotes optical carrier and x denotes the rate, e.g., an OC-3 format, an OC-48 format, an OC-192 format, etc.

Such optical networks generally include routing elements such as wavelength switching cross-connects, wavelength adapters, wavelength interchanging cross-connects, etc. A wavelength switching cross-connect serves to cross-connect incoming wavelengths on a given input fiber to different output fibers, but does not provide any transformation in wavelength. When only this type of routing device is present in an optical network, the network typically routes a given end-to-end demand using a single wavelength. If a primary network path assigned to the given demand fails, the demand generally must be carried on a secondary or restoration path using exactly the same wavelength as the primary path. A wavelength adapter is a device which allows conversion of wavelength at the client-network interface. A wavelength interchanging cross-connect is used to cross-connect incoming wavelengths onto different output fibers while also providing transformation of wavelengths.

One type of approach to providing failure protection in an optical network formed of these and other elements is to provide complete redundancy, such that the network includes a dedicated backup or secondary connection for each primary connection of the network. When a link, span or node of the primary connection fails, traffic may then be switched onto the corresponding elements of the secondary connection.

FIG. 1 shows an example traffic demand between two nodes A and Z of a given network. In this example, the demand is two units of OC-x traffic, each unit corresponding to one of the dashed lines between nodes A and Z.

FIG. 2 illustrates a conventional network protection approach as applied to the two units of OC-x traffic in the FIG. 1 example. This approach is an example of the above-noted complete redundancy approach, and is known in the art as "1+1" protection or "bridge and select." In this approach, the first and second units of OC-x traffic are routed in the manner indicated at 100 and 110, respectively. More particularly, an original signal corresponding to the first unit of OC-x traffic is routed on a first link 102 between the nodes A and Z, while a copy of this signal is routed on a second link 104 between the nodes A and Z. A particular one of the original signal or the copy is then selected at the destination node Z. The second unit of OC-x traffic is routed in a similar manner, with an original signal corresponding to the second unit of OC-x traffic routed on a link 112 between the nodes A and Z, while a copy of this signal is routed on a link 114 between the nodes A and Z. Again, a particular one of the original signal or the copy is then selected at the destination node Z.

The "bridge and select" approach illustrated in FIG. 2 provides complete redundancy for the capacity required to route the two units of OC-x traffic between nodes A and Z. However, this approach suffers from a number of significant drawbacks. For example, although the approach provides link protection, i.e., protection against a failure in one of the primary links 102 or 112, it fails to provide span protection, where span protection refers generally to an ability to switch locally from a primary trunk to a backup trunk. In addition, since a full unit of the OC-x traffic is assigned to each link, this approach does not accommodate preemptible traffic, and fails to provide any opportunity for quality of service (QoS) enhancement.

More sophisticated approaches may involve the use of a path restoration algorithm to provide automatic restoration of network traffic in the event of a primary path failure, while sharing restoration capacities whenever possible, so as to reduce the total amount of required redundant capacity.

Examples of known path restoration algorithms are described in, e.g., U.S. Pat. No. 6,021,113 issued Feb. 1, 2000 in the name of inventors Bharat T. Doshi et al. and entitled "Distributed Precomputation of Network Signal Paths with Table-Based Link Capacity Control," J. Anderson, B. T. Doshi, S. Dravida and P. Harshavardhana, "Fast Restoration of ATM Networks," JSAC 1991; W. D. Grover, "The Self-Healing Network: A Fast Distributed Restoration Technique for Networks Using Digital Cross Connect Machines," IEEE Globecom 1987; U.S. Pat. No. 4,956,835, issued to W. D. Grover on Sep. 11, 1990; C. H. Yang et al., "FITNESS: Failure Immunization Technology for Network Service Survivability," IEEE Globecom 1988; C. Edward Chow, J. Bicknell, S. McCaughey and S. Syed, "A Fast Distributed Network Restoration Algorithm," IEEE Globecom '93, pp. 261–267, 1993; and S. Hasegawa, Y. Okanone, T. Egawa and H. Sakauchi, "Control Algorithms of SONET Integrated Self-Healing Networks;" and U.S. Pat. Nos. 5,435,003 and 5,537,532, both entitled "Restoration in Communications Networks" and issued to R. S. K. Chng, C. P. Botham and M. C. Sinclair.

These more sophisticated approaches are often computationally intensive, and are therefore not appropriate or desirable in many applications. What is needed is a simple approach which utilizes redundancy but also overcomes the above-noted problems associated with the conventional "bridge and select" approach.

SUMMARY OF THE INVENTION

The present invention provides techniques for protecting against network failures in an optical network or other type of network.

In accordance with the invention, units of OC-x traffic or other type of traffic are routed between nodes in a network on corresponding sets of trunks, such that the traffic is balanced between disjoint paths, and a restoration process for the traffic is implemented using service layer or transport layer switching. The service layer switching may be, e.g., Internet protocol (IP) switching or other type of service layer packet-based switching.

In a first illustrative embodiment of the invention, first and second nodes are connected by first and second sets of trunks, with each of the trunks in a given set of trunks supporting a designated portion of a given one of the units of traffic. For example, the units of traffic may be routed such that a first half of a given one of the units of traffic is routed on a first one of the trunks in a given one of the sets of trunks, and a second half of the given unit is routed on a second one of the trunks in the given set of trunks.

In other illustrative embodiments of the invention, the first and second nodes are connected by first and second sets of trunks so as to form a four-trunk ring, with each of the first and second sets of trunks including a primary trunk and a backup trunk. A given one of the units of traffic is then routed on either an upper or lower portion of the ring. For example, the given unit of traffic may be split equally between the primary trunk and the backup trunk associated with the upper or lower portion of the ring, or routed entirely on the primary trunk associated with the upper or lower portion of the ring.

The four trunk ring may be in the form of an IP/optical hybrid ring, in which case the restoration process is implemented using service layer switching, or a SONET/optical ring, in which case the restoration process is implemented using transport layer switching.

Advantageously, the present invention in one or more of the above-noted embodiments is able to accommodate preemptible traffic, and can provide an opportunity for quality of service (QoS) enhancement. The network failure protection techniques of the invention thus make more efficient use of redundant capacity than the conventional techniques described above. The techniques of the present invention are well-suited for use in complex fiber-based optical networks which include wavelength select devices, wavelength adapters, wavelength interchange devices and other types of optical routers, but are more generally applicable to any other type of network and any type of transport medium.

These and other features and advantages of the present invention will become more apparent from the accompanying drawings and the following detailed description.

DETAILED DESCRIPTION OF THE INVENTION

The invention will be illustrated herein in conjunction with the routing of exemplary OC-x traffic between a pair of nodes in a network. It should be understood, however, that the invention is not limited to use with any particular type of traffic demand, network node or network, but is instead more generally applicable to any network traffic routing situation in which it is desirable to provide improved protection against network failures. For example, the network failure protection techniques of the invention may be utilized not only in optical networks, but also in telephone, cable and other electrical networks. The term "network" as used herein is therefore intended to include, e.g., optical networks, electrical networks and hybrid optical-electrical networks. The term "service layer" is intended to include without limitation Internet protocol (IP), asynchronous transfer mode (ATM), frame relay, or other type of communication technique associated with packet-based switching. The term "transport layer" is intended to include without limitation a layer which is below the service layer and provides a transport mechanism for services implemented in the service layer. Examples of transport layer communication techniques include synchronous optical network/synchronous digital hierarchy (SONET/SDH), optical networking, PDH, etc.

Figure 1:
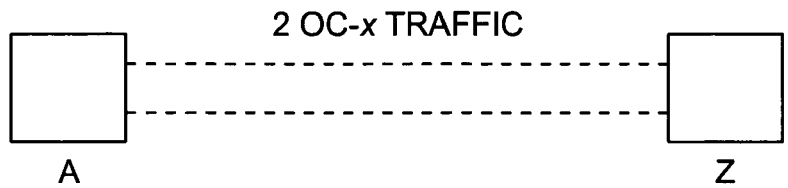
FIG. 1 shows an example traffic demand between two nodes of a network.
Figure 2:
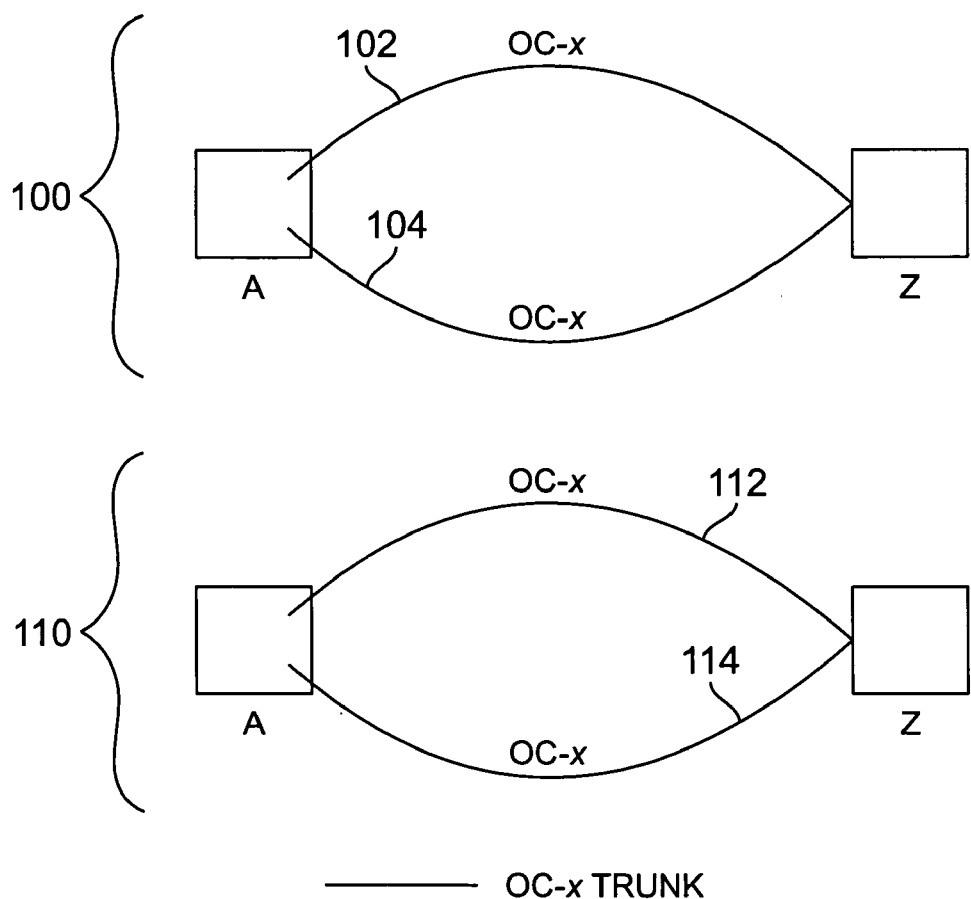
FIG. 2 illustrates a conventional "bridge and select" approach to routing of the example traffic of FIG. 1.
Figure 3:
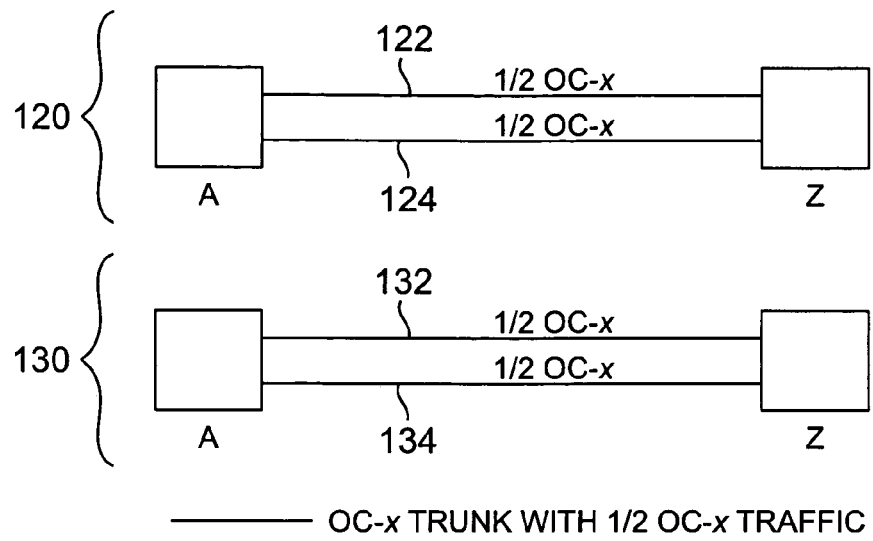
FIGS. 3, 4 and 5 show the routing of the example traffic of FIG. 1 in accordance with respective first, second and third illustrative embodiments of the invention.

FIG. 3 shows the routing of the FIG. 1 traffic in accordance with a first illustrative embodiment of the invention. This embodiment utilizes an approach referred to herein as a 2F IP ring, where "2F" denotes "two fiber" and IP refers to Internet protocol. In this approach, the first and second units of OC-x traffic shown in FIG. 1 are routed in the manner indicated at 120 and 130, respectively. More particularly, the first unit of OC-x traffic is split in half and each half is routed on one of two separate OC-x trunks 122 and 124 between the nodes A and Z. The second unit of OC-x traffic is routed in a similar manner, i.e., the second unit is split in half and each half is routed on one of two separate OC-x trunks 132 and 134 between the nodes A and Z. Each of the trunks 122, 124, 132 and 134 has a capacity of one full unit of OC-x traffic, and is therefore loaded to 50% of its capacity by the routing shown in FIG. 3.

In the 2F IP ring approach illustrated in FIG. 3, the traffic is split between two disjoint paths. Failure detection is preferably implemented at the physical layer of the well-known Open Systems Interconnection (OSI) model. The physical layer of the OSI model is also referred to herein as the transport layer. Restoration is preferably implemented at the network layer of the OSI model. The IP layer referred to herein is an example of the network layer of the OSI model. A failure may be detected at the transport layer and communicated to the IP layer so as to force a switch of the one-half unit of OC-x traffic from the affected trunk to the alternate trunk. It should be noted that, although it is believed that no standard signaling exists for this type of cross-layer communication, numerous suitable implementations for such switching will be readily apparent to those skilled in the art.

Advantageously, since each OC-x trunk 122, 124, 132 and 134 is loaded to only 50% of its capacity, the 2F IP ring approach allows the implementation of enhanced Quality of Service (QoS) capabilities, such as reduced delay or packet loss, while there are no maintenance or restoration activities taking place.

Figure 4:
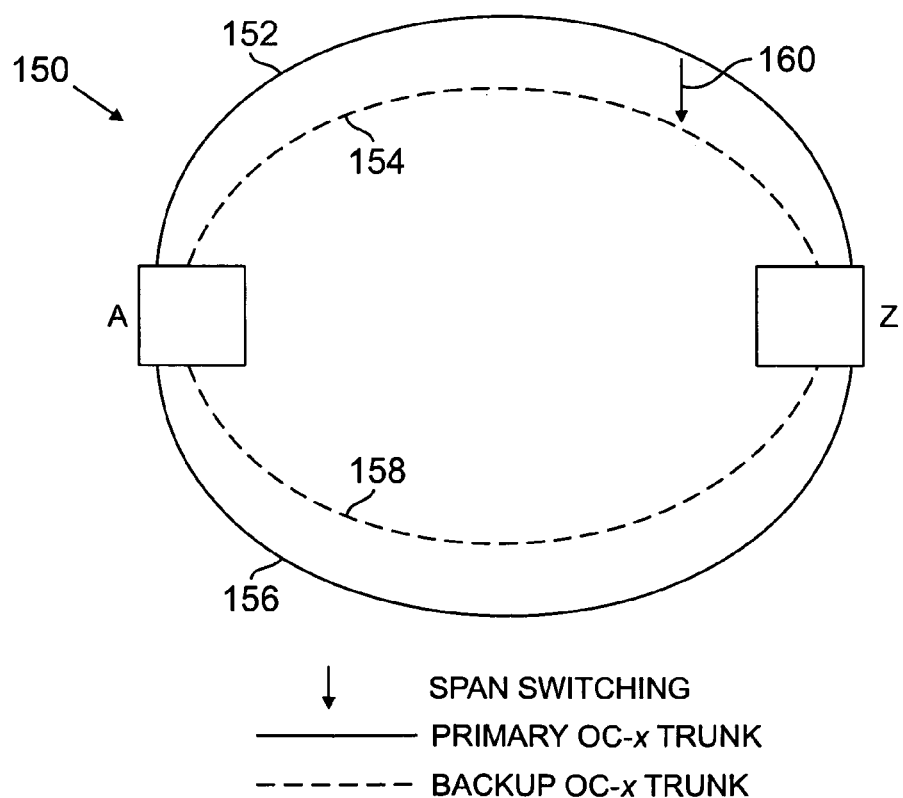

FIG. 4 shows the routing of the FIG. 1 traffic in accordance with a second illustrative embodiment of the invention. This embodiment utilizes an approach referred to herein as a 4F IP/optical hybrid ring, where "4F" denotes "four fiber" and IP again refers to Internet protocol. The 4F IP/optical hybrid ring is shown generally at 150 in FIG. 4, and includes nodes A and Z, primary OC-x trunks 152 and 156 illustrated as solid lines, and backup OC-x trunks 154 and 158 illustrated as dashed lines. The downward arrow 160 denotes a span switching operation, in this case from primary trunk 152 to backup trunk 154.

In this approach, the first and second units of OC-x traffic shown in FIG. 1 are routed such that one unit of OC-x traffic is routed on the top half of the ring 150, while the other unit is routed on the bottom half of the ring 150.

There are two options for implementing this type of loading. In the first loading option, a given unit of OC-x traffic is split equally between the primary and backup trunks on a particular half of the ring 150. For example, the first unit of the OC-x traffic may be split equally between the primary and backup trunks 152 and 154, respectively, while the second unit of the OC-x traffic may be split equally between the primary and backup trunks 156 and 158, respectively. This loading option allows enhanced QoS to be provided in a manner similar to that previously described in conjunction with the 2F IP approach. Each of the trunks 152, 154, 156 and 158 has a capacity of one full unit of OC-x traffic, and is therefore loaded to 50% of its capacity by this first option.

In the second option, the entire unit of OC-x traffic for a given half of the ring 150 is routed on the primary OC-x trunk for that half. For example, the entire first unit of OC-x traffic may be routed on primary trunk 152 in the upper half of the ring 150, while the entire second unit of OC-x traffic is routed on the primary trunk 156 in the lower half of the ring 150. The primary trunks 152 and 156 are thus loaded to 100% of their capacity in this example. As a result, it is not possible to provide enhanced QoS.

The 4F IP/optical hybrid ring approach illustrated in FIG. 4 thus balances the traffic between two disjoint paths. As in the 2F IP ring approach of FIG. 3, failure detection is again preferably implemented at the transport layer, while restoration is implemented at the IP layer.

In the first loading option described above, i.e., when the load is split equally between primary and backup trunks, span switching may be performed at the IP layer with the aid of transport layer signaling. In the second loading option, i.e., when the load is placed entirely on the primary trunks, a transport layer span switch can be used and no IP layer action is required. Note that in both the first and second options, multiple span maintenance activities on disjoint spans can proceed in parallel.

As noted above, detection of a node or fiber span failure may again be implemented at the transport layer. More specifically, such a failure may be detected at the transport layer and communicated to the IP layer so as to control the switching of OC-x traffic from a primary trunk to a backup trunk on a given half of the ring, or from one half of the ring to the other half of the ring.

It should be noted that the 4F IP/optical hybrid ring approach provides additional reliability relative to a conventional 2F optical ring in the presence of multiple failures. For example, when a span maintenance is in effect on the primary trunk of one half of the ring and the backup fiber is cut, the traffic can be switched to the other half of the ring. In the 2F optical ring case, the traffic is lost, as both halves of the ring are unavailable.

Figure 5:
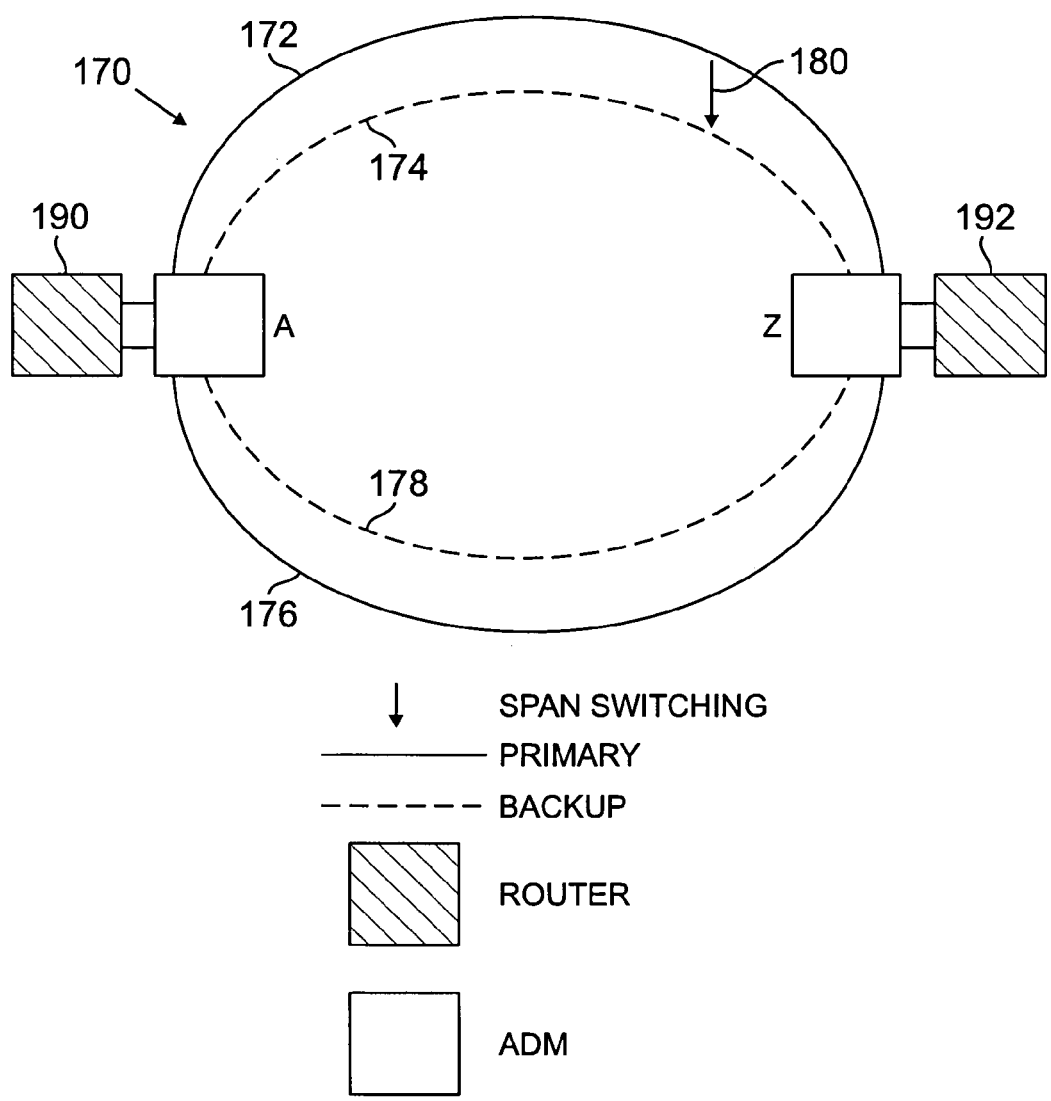

FIG. 5 shows the routing of the FIG. 1 traffic in accordance with a third illustrative embodiment of the invention. This embodiment utilizes an approach referred to herein as a 2 node and 4 fiber SONET/optical ring. The 2 node and 4 fiber SONET/optical ring is shown generally at 170 in FIG. 5, and includes nodes A and Z, primary OC-x trunks 172 and 176 illustrated as solid lines, and backup OC-x trunks 174 and 178 illustrated as dashed lines. The downward arrow 180 denotes a span switching operation, in this case from primary trunk 172 to backup trunk 174. The ring 170 further includes routers 190 and 192, coupled to nodes A and Z, respectively. The nodes A and Z in this embodiment are assumed to be implemented as add-drop multiplexers (ADMs), although other devices could also be used.

As in the 4F IP/optical hybrid ring approach illustrated in FIG. 4, the first and second units of OC-x traffic shown in FIG. 1 are routed in this approach such that one unit of OC-x traffic is routed on the top half of the ring 170, while the other unit is routed on the bottom half of the ring 170.

Like the FIG. 4 approach, the 2 node and 4 fiber SONET/optical ring approach of FIG. 5 balances the traffic between two disjoint paths. However, in the FIG. 5 approach, both failure detection and restoration are preferably implemented at the transport layer. In addition, span switching and restoration in the FIG. 5 approach may be performed in accordance with well-known conventional SONET/optical ring techniques.

There is generally no possibility for enhanced QoS in the FIG. 5 approach. However, if protection access is available, it may be possible to use the protection channels for pre-emptible traffic.

Advantageously, since the FIG. 5 approach performs both failure detection and restoration at the transport layer, it is likely to be the fastest in terms of restoration of the illustrative approaches described herein.

Figure 6:
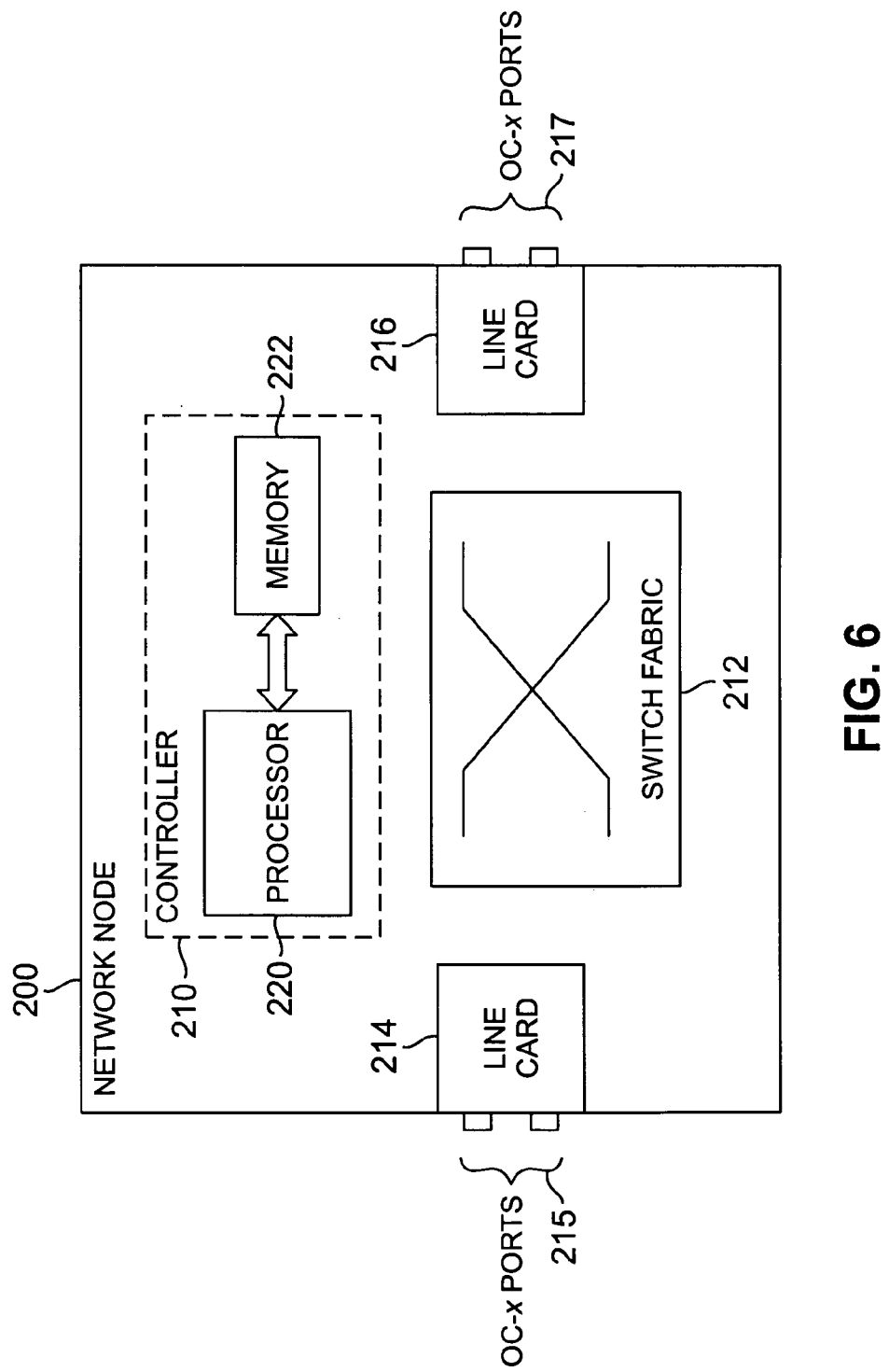
FIG. 6 shows a block diagram of a network node in accordance with the invention.

FIG. 6 shows an exemplary network node 200 which may be used to implement the above-described routing functions. The node 200 may therefore correspond, e.g., to node A or node Z in the illustrative embodiments of FIGS. 3 through 5.

The network node 200 includes a controller 210, a switch fabric 212, a first line card 214 having a set of OC-x ports 215 associated therewith, and a second line card 216 having a set of OC-x ports 217 associated therewith. It should be understood that the node 200 has been simplified for purposes of illustration. For example, the node 200 in practice may include a substantially larger number of line cards and ports, as required for a given application.

The controller 210 includes a processor 220 and a memory 222. The processor 220 may be, e.g., a microprocessor, a microcontroller, an application-specific integrated circuit (ASIC) or other type of processing device, as well as portions or combinations of such devices. The memory 222 may include an electronic random access memory (RAM), a read-only memory (ROM) or other type or memory device, as well as portions or combinations of such devices. The memory 222 may be used to store a demand database for storing demands for network capacity, and a set of routing tables which specify routing paths through a corresponding network for particular demands.

It should be noted that the node 200 may be an element of an optical network or other type of network which includes a very large number of nodes, and possibly a central controller. One or more of the nodes and the central controller may each represent a computer, processor-based switch or other type of processor-based device configured to provide the network protection techniques described herein. The invention is well-suited for use in large-scale regional, national and international networks which may include many subnetworks, each having hundreds of nodes, but can be used in any network application.

The above-described embodiments of the invention are intended to be illustrative only. For example, although described in conjunction with OC-x traffic over fiber trunks, the invention can be applied to networks utilizing any desired type of traffic or network transport medium. The term "trunk" as used herein is therefore intended to include not only fiber trunks but more generally any other type of transport medium. In addition, the IP layer techniques described herein could be implemented using other types of packet-based service layer techniques, such as asynchronous transfer mode (ATM), frame relay, multi-protocol label-switched (MPLS), etc. These and numerous other alternative embodiments may be devised by those skilled in the art without departing from the scope of the following claims.

What is claimed is:

1. A method of routing traffic between first and second nodes in a network so as to provide protection against network failures, the method comprising the steps of:
   routing units of traffic on corresponding sets of trunks connected between the first and second nodes such that the traffic is balanced between disjoint paths; and
   implementing a restoration process for the traffic;
   the first and second nodes being connected by first and second sets of trunks such that the nodes and sets of trunks form a ring having at least four trunks, the first set of trunks carrying traffic in a given direction from the first node to the second node and being associated with one of an upper portion and a lower portion of the four-trunk ring, the second set of trunks carrying traffic in the given direction from the first node to the second node and being associated with the other of the upper portion and the lower portion of the four-trunk ring, wherein each of the first and second sets of trunks includes a primary trunk and a backup trunk, both the primary trunk and the backup trunk of each of the first and second sets of trunks being configurable to carry traffic in the given direction from the first node to the second node;
   a given one of the units of traffic comprising a unit of traffic to be transmitted in the given direction from the first node to the second node utilizing one of the upper portion and the lower portion of the four-trunk ring;
   wherein the first and second nodes are configured to perform, in conjunction with the restoration process for the given unit of traffic, span switching between the primary trunk and the backup trunk of the associated portion of the four-trunk ring.

2. The method of claim 1 wherein the given unit of traffic comprises one or more OC-x units of traffic.

3. The method of claim 1 wherein the restoration process utilizes a service layer switching process comprising a packet-based switching process.

4. The method of claim 1 wherein the restoration process utilizes a service layer switching process comprising an Internet protocol (IP) switching process.

5. The method of claim 1 wherein each of the trunks in a given set of trunks supports a designated portion of at least one of the units of traffic.

6. The method of claim 1 wherein the units of traffic are routed such that a first half of the given one of the units of traffic is routed on the primary trunk, and a second half of the given unit is routed on the backup trunk, in the associated portion of the four-trunk ring.

7. The method of claim 6 wherein the restoration process is implemented using service layer switching.

8. The method of claim 1 wherein the given unit of traffic is split equally between the primary trunk and the backup trunk of the associated upper or lower portion of the ring.

9. The method of claim 1 wherein the given unit of traffic is routed entirely on the primary trunk of the associated upper or lower portion of the ring.

10. The method of claim 1 wherein the ring comprises an IP/optical hybrid ring, and the restoration process is implemented using service layer switching.

11. The method of claim 1 wherein the ring comprises a SONET/optical ring, and the restoration process is implemented using transport layer switching.

12. The method of claim 1 wherein the first and second nodes comprise add-drop multiplexers connected by the sets of trunks, each of the add-drop multiplexers also being coupled to a corresponding router.

13. The method of claim 1 wherein the units of traffic are routed between the first and second nodes so as to provide an opportunity to implement an enhanced quality of service (QoS) for at least one of the units of traffic.

14. An apparatus for routing traffic in a network so as to provide protection against network failures, the apparatus comprising:
   first and second network nodes connected by sets of trunks, wherein units of traffic are each routed on a corresponding one of the sets of trunks such that the units of traffic are balanced between disjoint paths between the first and second nodes, the first and second nodes further being configured to implement a restoration process for the traffic;
   the first and second nodes being connected by first and second sets of trunks such that the nodes and sets of trunks form a ring having at least four trunks, the first set of trunks carrying traffic in a given direction from the first node to the second node and being associated with one of an upper portion and a lower portion of the four-trunk ring, the second set of trunks carrying traffic in the given direction from the first node to the second node and being associated with the other of the upper portion and the lower portion of the four-trunk ring, wherein each of the first and second sets of trunks includes a primary trunk and a backup trunk, both the primary trunk and the backup trunk of each of the first and second sets of trunks being configurable to carry traffic in the given direction from the first node to the second node;
   a given one of the units of traffic comprising a unit of traffic to be transmitted in a direction from the first node to the second node utilizing one of the upper portion and the lower portion of the four-trunk ring;
   wherein the first and second nodes are configured to perform, in conjunction with the restoration process for the given unit of traffic, span switching between the primary trunk and the backup trunk of the associated portion of the four-trunk ring.

15. An apparatus for routing traffic in a network so as to provide protection against network failures, the apparatus comprising:
   a first network node, the first node being connectable to at least a second network node by sets of trunks, wherein units of traffic are each routed on a corresponding one of the sets of trunks such that the units of traffic are balanced between disjoint paths between the first and second nodes, the first node further being configured to implement at least a portion of a restoration process for the traffic;

the first and second nodes being connected by first and second sets of trunks such that the nodes and sets of trunks form a ring having at least four trunks, the first set of trunks carrying traffic in a given direction from the first node to the second node and being associated with one of an upper portion and a lower portion of the four-trunk ring, the second set of trunks carrying traffic in the given direction from the first node to the second node and being associated with the other of the upper portion and the lower portion of the four-trunk ring, wherein each of the first and second sets of trunks includes a primary trunk and a backup trunk, both the primary trunk and the backup trunk of each of the first and second sets of trunks being configurable to carry traffic in the given direction from the first node to the second node;

a given one of the units of traffic comprising a unit of traffic to be transmitted in a direction from the first node to the second node utilizing one of the upper portion and the lower portion of the four-trunk ring;

wherein the first and second nodes are configured to perform, in conjunction with the restoration process for the given unit of traffic, span switching between the primary trunk and the backup trunk of the associated portion of the four-trunk ring.

* * * * *